INVENTOR
Thomas C. Drew, Jr.

BY
ATTORNEY

United States Patent Office
3,290,594
Patented Dec. 6, 1966

3,290,594
POLYPHASE MULTI-ELEMENT INDUCTION METER WITH COMMON EDDY CURRENT ARMATURE HAVING SOLID AND SLOTTED LAMINATIONS
Thomas C. Drew, Jr., Raleigh, N.C., assignor to Westinghouse Electric Corporation, Pittsburgh, Pa., a corporation of Pennsylvania
Filed Feb. 27, 1963, Ser. No. 261,317
10 Claims. (Cl. 324—107)

This invention relates to multi-element induction devices and it has particular relation to such devices wherein a common electroconductive armature is subjected to a plurality of shifting magnetic fields.

Although the invention is applicable to various multi-element induction devices such as induction relays and induction indicating instruments it is particularly suitable for integrating meters. In the discussion which follows it will be assumed that the invention is applied in a preferred embodiment to an induction-type polyphase watthour meter.

When a common armature is employed with a plurality of driving electromagnetic elements in a polyphase induction watthour meter it is common practice to construct the armature in the form of a laminated disc wherein each lamination of the disc is slotted. The purpose of the slots in the laminations is to reduce interference between the elements of the polyphase meter. These slots restrict the disc currents produced by one element or stator from reacting with the field of the other element or stator of the polyphase meter and thus reduce errors of registration known as interference errors.

As previously employed the slotted disc introduces a number of design limitations. For a given thickness of the resultant disc the slotted disc results in materially less torque acting to produce rotation of the disc than is obtained from a solid disc. As a result of their "anti-creep" characteristics, the slots increase the starting watts required to initiate rotation of the disc.

Because of the alternating energization of the meter a solid disc is subject to a substantial amount of mechanical vibration. This vibration is useful in overcoming friction present in the gearing commonly associated with the disc for operating a register. The vibration is maintained below the values which would produce excessive noise and wear. Because of the materially reduced mechanical vibration of the slotted disc the friction and repeatability error of the register is substantially increased.

As a further example of the design problems presented by the slotted disc, reference may be made to the need for magnetic shields which have been resorted to in the prior art for further reducing the errors introduced by interference between the meter elements.

In accordance with the invention a common electroconductive armature associated with a plurality of electromagnetic driving elements in a meter is constructed of a plurality of dissimilar parts. These parts are selected to increase the available torque of the meter without introducing objectionable interference error. Preferably the parts are also selected to provide a reasonable amount of mechanical vibration of the armature in order to improve operation of the register which may be associated with the armature. In a desired form of the invention the parts introduce interference errors which are opposite in sign. By proper proportioning of the parts the interference error may be substantially eliminated without resort to shields or other devices.

In a preferred embodiment of the invention the armature takes the form of a laminated disc wherein the laminations are constructed of electroconductive material. At least one of the disc laminations is of solid construction whereas the remainder of the laminations may be of slotted construction. The solid lamination decreases the starting watts of the meter.

It is therefore an object of the invention to provide an improved multi-element induction device having a common armature.

It is also an object of the invention to provide an improved common armature multi-element induction device having high torque and low interference error.

It is an additional object of the invention to provide a common-armature multi-element induction device wherein the armature is constructed of dissimilar electroconductive parts.

It is another object of the invention to provide a multi-element induction integrating meter having a common armature wherein the armature is constructed of laminations certain of the laminations being of solid construction and certain of the laminations being slotted.

It is a further object of the invention to provide an improved common armature multi-element induction device having low interference error and low starting watts.

Other objects of the invention will be apparent from the following discussion taken in conjunction with the accompanying drawings in which.

Figure 1:
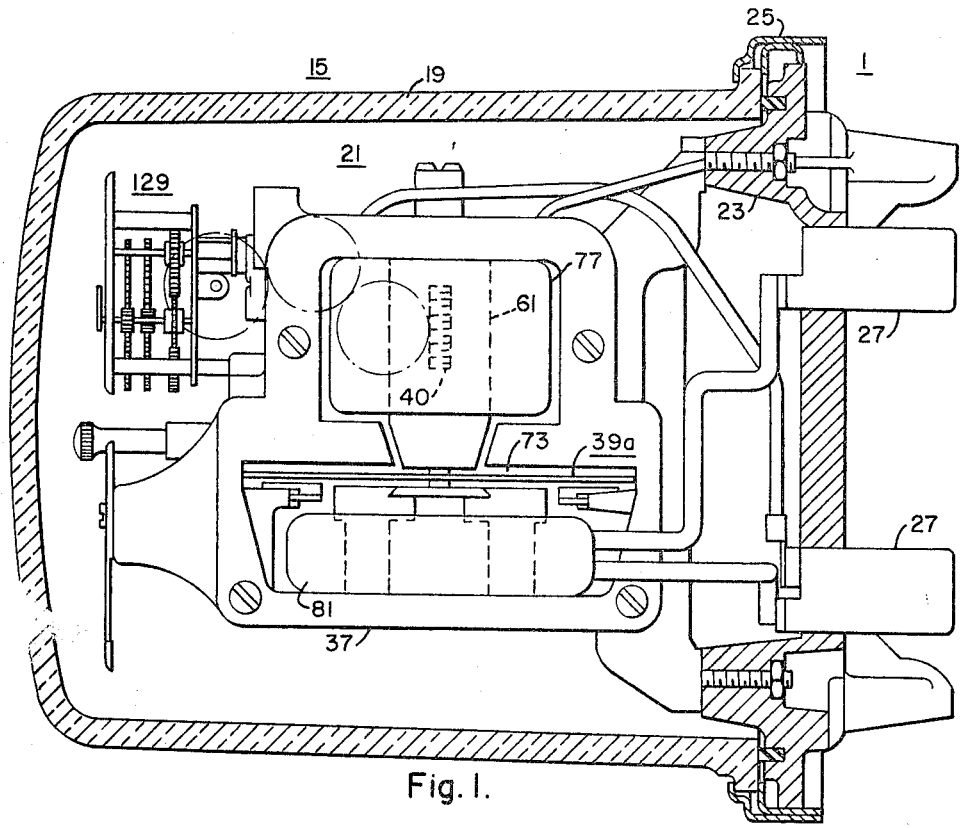
FIGURE 1 is a view in side elevation with parts broken away of a multi-element watthour meter embodying the invention.

In order to simplify the presentation of the invention a polyphase watthour meter is shown in the drawing which with the exception of the armature is similar to the meter shown in the Wallace Patent 2,909,729 issued October 20, 1959. The same reference character is employed for identifying similar components in the present drawing and in the Wallace patent. For convenience some of the components which are similar in the present drawing and in the patent are listed as follows:

1—meter
15—cover receptacle
19—cover
21—operating parts of meter
23—base member
25—rim structure
27—contact blades
35, 37—electromagnetic elements
40—shaft
41, 58—magnetic structure
43, 59—magnetic laminations
45, 61—voltage magnetic pole
49, 51, 65, 67—current magnetic poles
57, 73—air gap
75, 77—voltage windings
79, 81—current windings
129—register assembly
149—permanent damping magnet In the embodiment of the invention which is herein illustrated, an armature 39a is employed which is laminated from a plurality of electroconductive discs. Desirably the discs may be constructed of sheet aluminum. Certain of the discs such as the discs 39a1, 39a2 and 39a3, are of slotted construction whereas at least one of the discs such as the disc 39a4 has less than the number of slots in the slotted discs and preferably is of solid construction. The number of solid discs and the number of slotted discs may be selected as desired. However, one solid disc and three slotted discs as illustrated have been found to provide a very satisfactory armature.

Figures 2, 3:
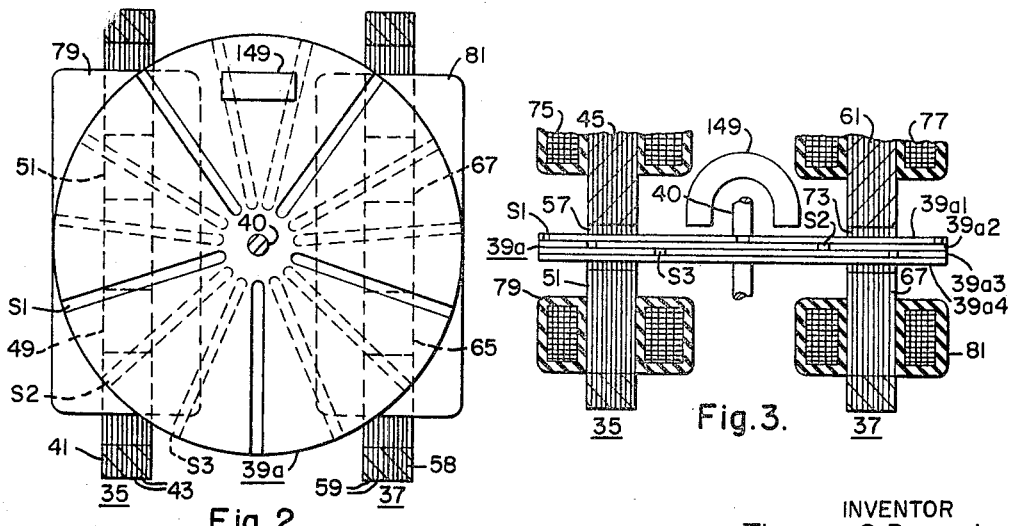
FIG. 2 is a view in top plan showing the association of the armature and magnetic structures as employed in the embodiment of FIG. 1 with parts broken away.
FIG. 3 is a view in front elevation with parts broken away of the structure shown in FIG. 2.

The number of slots employed in the slotted discs may be selected as desired. In the specific embodiment shown in the drawings, five slots are employed in each of the slotted discs. Thus the disc 39a1 has five radial slots S1 which terminate short of the center of the disc. Adjacent slots S1 are spaced angularly from each other about the shaft 40 by 72°. In a similar manner the laminations 39a2 and 39a3 are provided with slots S2 and S3 respectively. By inspection of FIG. 2 it will be noted that each of the slots in one of the slotted laminations is spaced angularly about the axis of the armature from the nearest slots in the other two slotted laminations. The uniform spacing of the slots assists in minimizing starting watts for the meter.

The laminations of the armature are secured to each other in any suitable manner as by an adhesive. The laminations are insulated from each other by thin films of insulation which also may be employed as the adhesive for uniting the laminations. In a preferred embodiment, a phenolic-nitrile rubber adhesive is employed.

In operation the electromagnetic elements 35 and 37 have their voltage and current windings energized from a polyphase alternating current electrical circuit. Suitable connections for this purpose are well known in the art and a number of such circuits will be found in Section 7 of the Electrical Metermen's Handbook, 6th Edition, published in 1950 by the Edison Electric Institute of New York City. When energized the electromagnetic elements 35 and 37 develop shifting magnetic fields in their air gaps 57 and 73. These shifting magnetic fields act inductively on the armature 39a for the purpose of rotating the armature in accordance with a function of the volt amperes of the associated polyphase circuit.

Because of the presence of the solid lamination 39a4 the torque derived by the armature from the electromagnetic elements 35 and 37 is substantially increased. In a specific example it was found that the addition of a solid lamination to a plurality of slotted laminations to form an armature increased the thickness of the conductive parts of the armature by 18% and increased the torque derived by the armature by 27%.

In addition the presence of a solid lamination 39a4 increases appreciably the mechanical vibration of the armature due to the alternating energizations of the electromagnetic elements. This vibration is effective in overcoming the effects of friction in the gearing associated with the armature and in the register assembly 129. The amount of vibration is not sufficient to be objectionable from the standpoint of noise or mechanical wear. In the specific example above referred to the addition of the solid lamination 39a4 substantially decreased the friction and repeatability error of the register. The repeatability error is caused by friction which prevents the register from repeating a reading with precision.

The presence of the slotted laminations 39a1, 39a2 and 39a3 materially reduces the interference error of the meter. The small remaining interference error is negative in value. In other words the interference error due to the slotted laminations tends to decrease the torque acting on the armature and the reading of the register assembly 129.

The interference error due to the solid lamination 39a4 tends to increase the torque acting on the armature and the reading of the register assembly. By proper proportioning of the laminations the resultant interference error can be limited to a small value such as 0.5%. This eliminates the need for accessory devices such as magnetic shields for further limiting interference error.

As previously pointed out, the presence of the solid lamination materially reduces starting watts for the meter.

In the specific example above discussed the slotted laminations 39a1, 39a2 and 39a3 were constructed of slotted aluminum discs having a diameter of 3.690 inches and having a thickness of 0.0105 inch. The solid lamination 39a4 was constructed of an aluminum disc having a thickness of 0.0055 inch. The resultant armature 39a had a total thickness of 0.039 inch. The performance of this armature was compared with that of an armature constructed of the three slotted laminations alone. The resultant disc constructed from the three slotted laminations alone had a total thickness of 0.0325 inch. These total thicknesses included the thickness of the cement.

Although the invention has been described with reference to certain specific embodiments thereof, numerous modifications falling within the spirit and scope of the invention are possible.

I claim as my invention:

1. In an induction device responsive to an alternating quantity, a plurality of electromagnetic structures each having an air gap and electroresponsive means effective when energized for producing a shifting magnetic field in the air gap, an electroconductive armature mounted for rotation relative to the electromagnetic structures about an axis, said armature having a portion disposed in each of the air gaps to develop a torque acting between the electromagnetic structures and the armature about the axis in response to said shifting magnetic fields, said armature comprising a plurality of laminations of electroconductive material positioned adjacent to each other, each having a portion disposed in each of the air gaps, and substantially symmetric relative to said axis, a first one of said laminations being slotted to limit the paths therein for eddy currents produced by the shifting magnetic fields and a second one of said laminations having less than the number of slots provided in the first one of said laminations to provide substantial paths for eddy currents produced in the second one of said laminations by the shifting magnetic fields.

2. In an induction device responsive to an alternating quantity, a plurality of electromagnetic structures each having an air gap and electroresponsive means effective when energized for producing a shifting magnetic field in the air gap, an electroconductive armature mounted for rotation relative to the electromagnetic structures about an axis, said armature having a portion disposed in each of the air gaps to develop a torque acting between the electromagnetic structures and the armature about the axis in response to said shifting magnetic fields, said armature comprising a plurality of dissimilar laminations of electroconductive material positioned adjacent to each other, and substantially symmetric relative to said axis, a first one of said laminations having a portion passing through each of the air gaps slotted to limit the paths therein for eddy currents produced by the shifting magnetic fields and a second one of said laminations having a portion passing through each of the air gaps providing a continuous cross-section of electroconductive material for eddy currents throughout the portion of the second one of said laminations which passes through said shifting magnetic fields in the air gaps.

3. In a multi-element polyphase induction meter; a plurality of electromagnets, each of said electromagnets comprising a magnetic structure providing an air gap, voltage winding means cooperating with the magnetic structure when energized by an alternating voltage for directing an alternating voltage magnetic flux through the air gap, and current winding means cooperating with the magnetic structure when energized by an alternating current for directing an alternating current magnetic flux through the air gap to establish with the voltage magnetic flux a shifting magnetic field; and an armature disc mounted for rotation relative to said magnetic structures about an axis, said armature disc comprising a plurality of adjacent dissimilar laminations of electroconductive material substantially insulated from each other and extending transversely of said axis and each having a portion positioned to pass through the air gaps, each of said magnetic fields when present acting to induce eddy currents in each of the laminations to produce a torque acting between the magnetic structures and the armature disc about said axis, a first one of said laminations having a plurality of radial sections with insulation therebetween, and a second one of said laminations being continuous over a plurality of said radial sections.

4. In a multi-element polyphase induction meter; a plurality of electromagnets, each of said electromagnets comprising a magnetic structure providing an air gap, voltage winding means cooperating with the magnetic structure when energized by an alternating voltage for directing an alternating voltage magnetic flux through the air gap, and current winding means cooperating with the magnetic structure when energized by an alternating current for directing an alternating current magnetic flux through the air gap to establish with the voltage magnetic flux a shifting magnetic field; and an armature disc mounted for rotation relative to said magnetic structure about an axis, said armature disc comprising a plurality of adjacent laminations of electroconductive material substantially insulated from each other and extending transversely of said axis and each having a portion positioned to pass through the air gap, each of said magnetic fields when present acting to induce eddy currents in each of the laminations to produce a torque acting between the magnetic structures and the armature disc about said axis, one of said laminations being of solid construction and each of a plurality of the remainder of said laminations having a plurality of radial slots angularly spaced about said axis to restrict the flow of eddy currents, the slots in one of said slotted laminations being angularly spaced about said axis from the slots in another of said slotted laminations.

5. In a multi-element polyphase induction meter; a plurality of electromagnetics, each of said electromagnets comprising a magnetic structure providing an air gap, voltage winding means cooperating with the magnetic structure when energized by an alternating voltage for directing an alternating voltage magnetic flux through the air gap, and current winding means cooperating with the magnetic structure when energized by an alternating current for directing an alternating current magnetic flux through the air gap to establish with the voltage magnetic flux a shifting magnetic field, and an electroconductive armature mounted for rotation about an axis relative to the magnetic structures through the air gaps, said magnetic fields when present acting to induce eddy currents in the armature to produce for each of the electromagnets a torque acting between the magnetic structures and the armature about said axis, said armature comprising a first portion concentric about said axis and positioned to pass through said air gaps and responsive to interference between torque-producing components derived from said two electromagnets for reducing the total torque acting between the magnetic structures and the armature and said armature comprising a second portion concentric about said axis and positioned to pas through said air gaps and responsive to interference between torque-producing components derived from said two electromagnets for increasing the total torque acting between the magnetic structures and the armature.

6. In a multi-element polyphase induction meter; a plurality of electromagnets, each of said electromagnets comprising a magnetic structure providing an air gap, voltage winding means cooperating with the magnetic structure when energized by an alternating voltage for directing an alternating voltage magnetic flux through the air gap, and current winding means cooperating with the magnetic structure when energized by an alternating current for directing an alternating current magnetic flux through the air gap to establish with the voltage magnetic flux a shifting magnetic field; and an electroconductive armature mounted for rotation about an axis relative to the magnetic structures through the air gaps, said magnetic fields when present acting to induce eddy currents in the armature to produce for each of the electromagnets a torque acting between the magnetic structures and the armature about said axis, said armature comprising a first radially-slotted portion concentric about said axis and positioned to pass through said air gaps and responsive to interference between torque-producing components derived from said two electromagnets for reducing the total torque acting between the magnetic structures and the armature, and said armature comprising a second solid portion concentric about said axis and positioned to pass through said air gaps and responsive to interference between torque-producing components derived from said two electromagnets for increasing the total torque acting between the magnetic structures and the armature.

7. In a multi-element induction meter, a stator assembly, a rotor assembly mounted for rotation about an axis relative to the stator assembly, said rotor assembly comprising a plurality of electroconductive armature elements concentric about said axis, said stator assembly comprising a plurality of electromagnets; each of the electromagnets comprising voltage winding means cooperating with the magnetic structure when energized by alternating voltage for directing an alternating voltage flux through said armature elements, and current winding means cooperating with the magnetic structure when energized by an alternating current for directing an alternating current magnetic flux through said armature elements to apply with the voltage magnetic flux a shifting magnetic field to each of said armature elements acting to develop a torque between the stator and the rotor assemblies in a first direction, a first one of said armature elements having a configuration substantially limiting eddy currents induced therein at any point by one of said magnetic fields to an angular distance around said axis which is less than 180°, a second one of said armature elements having a configuration providing a substantial path for eddy currents induced therein at any point by one of said magnetic fields extending for an angular distance around said axis which is more than 180°.

8. An induction meter as claimed in claim 7 wherein said first armature element comprises an electroconductive disc having a plurality of radial slots spaced uniformly about said axis, and said second armature element comprises a solid electroconductive disc.

9. An induction meter as claimed in claim 8 wherein said stator assembly provides two of said magnetic fields disposed on opposite sides of the axis.

10. An induction meter as claimed in claim 8 wherein said discs are adhesively united by an insulating adhesive to form a laminated assembly, said discs providing interference errors which are opposite in sign.

References Cited by the Examiner
UNITED STATES PATENTS

| 399,801 | 3/1889 | Thomson et al. | 317—167 X |
|---|---|---|---|
| 2,110,417 | 3/1938 | Green | 324—107 |
| 2,134,575 | 10/1938 | Pratt | 324—107 |
| 2,199,991 | 5/1940 | Green | 324—137 |

References Cited by the Applicant
UNITED STATES PATENTS 2,919,406   12/1959   Tschappu.

WALTER L. CARLSON, *Primary Examiner.*

RUDOLPH V. ROLINEC, *Examiner.*